United States Patent [19]

Bonis

[11] 4,398,143
[45] Aug. 9, 1983

[54] REMOTE SUPPLY CIRCUIT FOR ANALOG TWO-WIRE CONNECTION

[76] Inventor: Marc Bonis, 2 Allée des Maraîchers, 91310 Montlhery, France

[21] Appl. No.: 283,741

[22] Filed: Jul. 15, 1981

[30] Foreign Application Priority Data

Jul. 31, 1980 [FR] France .................. 80 16948

[51] Int. Cl.³ .............................................. H03H 1/00
[52] U.S. Cl. .................................. 323/370; 179/78 R;
340/870.39; 307/56
[58] Field of Search .................. 179/78, 74, 80, 78 R,
179/78 A, 79; 307/49, 51, 56; 323/370, 909;
340/870.39

[56] References Cited

U.S. PATENT DOCUMENTS

| 2,302,293 | 11/1942 | Brown | 179/78 R |
| 2,509,389 | 5/1950 | Blake | 179/78 R |
| 4,205,327 | 5/1980 | Dahlke | 323/909 X |
| 4,217,634 | 8/1980 | Dalley et al. | 340/870.39 X |

Primary Examiner—William M. Shoop
Attorney, Agent, or Firm—Oblon, Fisher, Spivak, McClelland & Maier

[57] ABSTRACT

This circuit comprises at least one power supply inserted between the earth and each of the two wires of the connection, two RC series dipoles in each case inserted between the earth and the two wires and a circuit able to fix to the earth the average potential of these wires.

Application to telephony and the supply of sensors.

4 Claims, 9 Drawing Figures

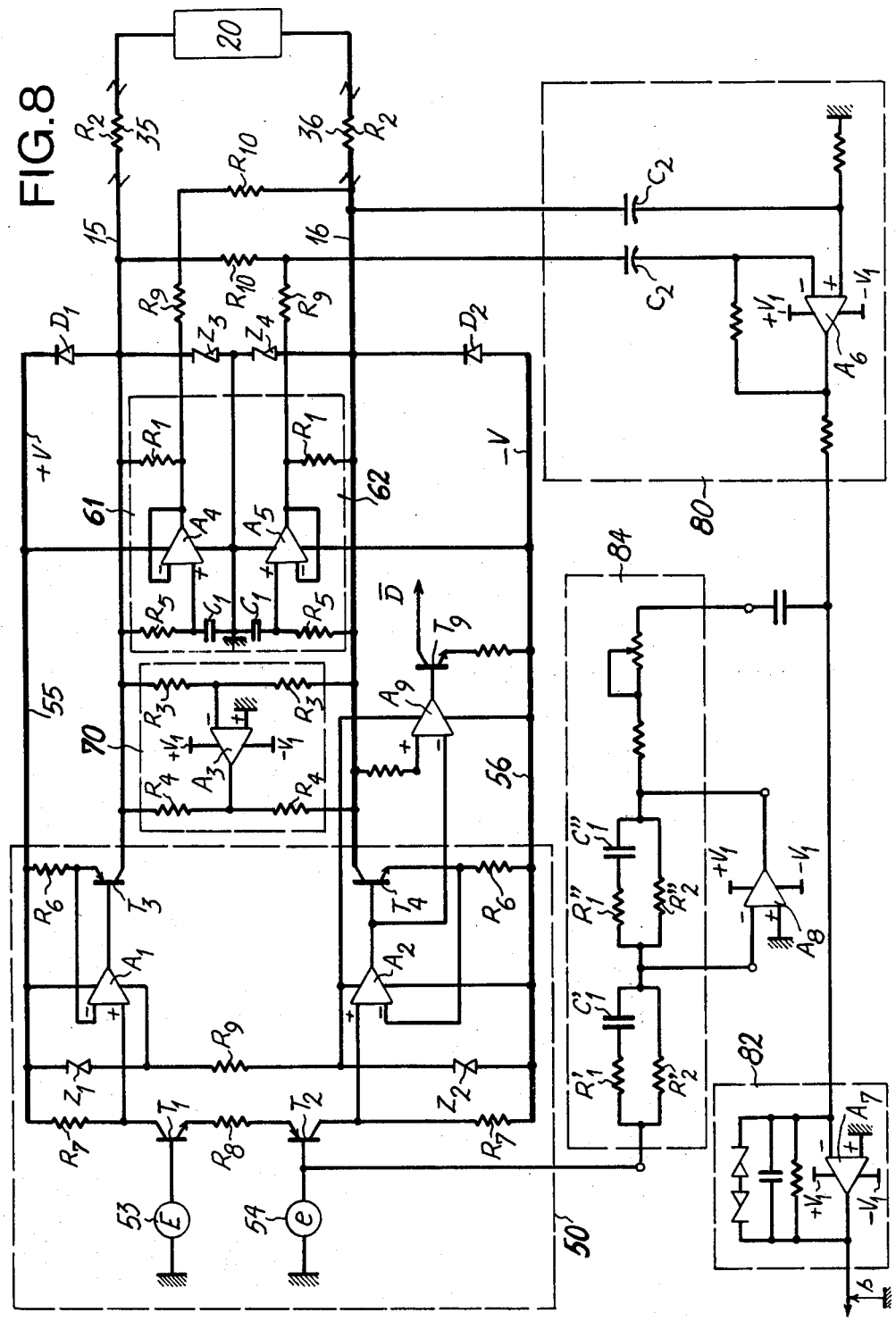

REMOTE SUPPLY CIRCUIT FOR ANALOG TWO-WIRE CONNECTION

The present invention relates to a remote supply circuit for an analog two-wire connection. It is more particularly used in telephony, e.g. in the production of automatic switches and more generally in the remote supply of probes or sensors.

Figure 1:
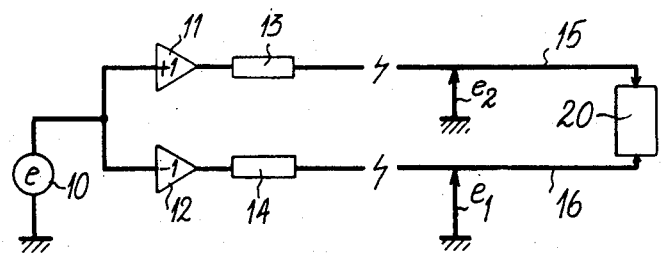

A remote supply circuit for an analog two-wire connection comprises in per se known manner and in accordance with the diagram of FIG. 1, a source 10 of voltage e, which represents information to be transmitted to a load 20, two voltage amplifiers 11 and 12 of respective gains $-1$ and $+1$ and two identical impedances 13 and 14, said amplifiers and impedances being inserted between load 20 and each of the wires 15, 16 of the connection.

This circuit arrangement provides protection against interference. Thus, the analog data is transmitted in the form of a voltage difference between the two wires 15, 16, each having the same impedance relative to earth. Under these conditions, interference causes on the voltages $e_1$ and $e_2$ of these wires substantially identical errors, which cancel one another out during the calculation of the difference $e_1-e_2$. The continuous remote supply is supplied by the direct current carried by the two-wire connection.

Figure 2:
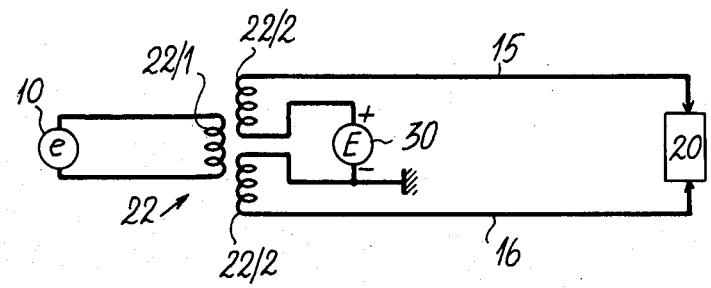

In accordance with the diagram of FIG. 2, the transformer is the most used component in this circuit arrangement. Transformer 22 comprises a primary winding 22/1 connected to source 10 and a secondary winding 22/2, constituted by two oppositely directed half-windings connected on the one hand to a source 30 of d.c. voltage E providing the continuous remote supply and on the other hand to wires 15, 16.

In this application, the transformer offers numerous advantages:

it is in the form of a single component and not an assembly;
it is very robust with respect to overloads;
the pure resistance of its windings can be reduced;
it provides a good galvanic insulation.

However, it has the following disadvantages:

its volume is a rising function of the remote supply current (the magnetic circuit must not be saturated);
to ensure that the impedances of the two secondary half-windings are as close together as possible they must be wound together (so-called two wires in hand winding system);
its volume is a rising function of the low cut-off frequency (the lower this frequency, the higher must be the inductances);
in addition, the lower the winding resistance the greater its volume;
finally, its cost is high.

These disadvantages outweigh the advantages, so that research has been carried out on entirely electronic circuit arrangements to attempt to obviate the use of the transformer. As a function of the envisaged circuits, the galvanic insulation is provided by means of optical couplers or by means of capacitors. In certain cases, this insulation is not ensured on knowing the extreme voltages liable to occur on the wires of the line. This is the case, for example, when the wires of the line have protections such as Zender diodes, spark gaps or the like.

Figure 3:
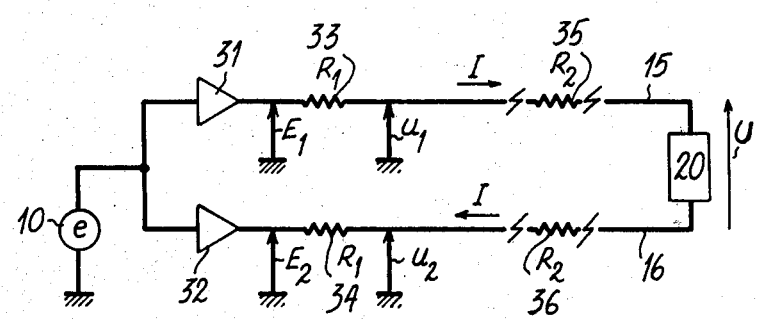

FIG. 3 illustrates a solution of this type. The circuit comprises two amplifiers 31, 32, two resistors 33, 34 of value $R_1$, the line resistors being symbolized by the two resistors 35, 36 of value $R_2$. The amplifiers 31 and 32 supply signals of form:

$$\begin{cases} E_1 = E_{10} + e/2 \\ E_2 = E_{20} - e/2 \end{cases}$$

The difference $E_0 = E_{10} - E_{20}$ represents the d.c. remote supply voltage, whilst e represents the analog signal transmitted. Furthermore, on designating by $I_0$ and $U_0$, the d.c. current and voltage required by the remotely supplied device 20, with i and u the variable current and voltage constituting the analog data support transmitted to the said device, we obtain:

$$U = U_0 + u \quad I = I_0 + i$$

Under these conditions, it is possible to write:

$$E_1 - E_2 = U + 2R_2I + 2R_1I$$

whence $$E_0 = e = U_0 + 2R_2I_0 + 2R_1I_0 + u + 2R_1i + 2R_2i$$

The above equation can be divided into two parts: a remote supply equation:

$$E_0 = U_0 + 2R_2I_0 + 2R_1I_0 \tag{1}$$

a transmission equation:

$$e = u + 2R_1i + 2R_2i \tag{2}$$

The remote supply equation reveals the disadvantage of the circuit of FIG. 3, namely the voltage drop $2R_1I_0$ cuts the remote supply voltage $E_0$ into a pure loss. To reduce this effect, it is necessary to reduce the remote supply current, which is not always possible.

The present invention aims at obviating the disadvantage, whilst proposing an electronic circuit of the type illustrated in FIG. 3.

Figure 4:
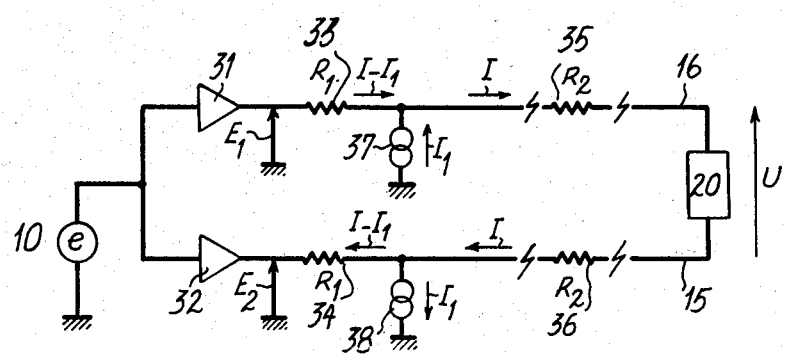

The basic idea of the invention is to modify the circuit diagram of FIG. 3 by adding to it two supplementary power supplies, carrying the references 37, 38 in FIG. 4, whilst the currents are supplied in opposite directions and with the intensity $I_1$.

Using the same notations as hereinbefore, the equations of this circuit arrangement are then written:

$$E_0 = U_0 = 2R_2I_0 + 2R_1(I_0 - I_1) \tag{3}$$

$$e = u + 2R_1i + 2R_2i \tag{4}$$

Equation (3) shows that if $I_1$ is equal to $I_0$, the remote supply voltage $E_0$ is not cut in the aforementioned manner and assumes the value $U_0 + 2R_2I_0$.

Figure 5:
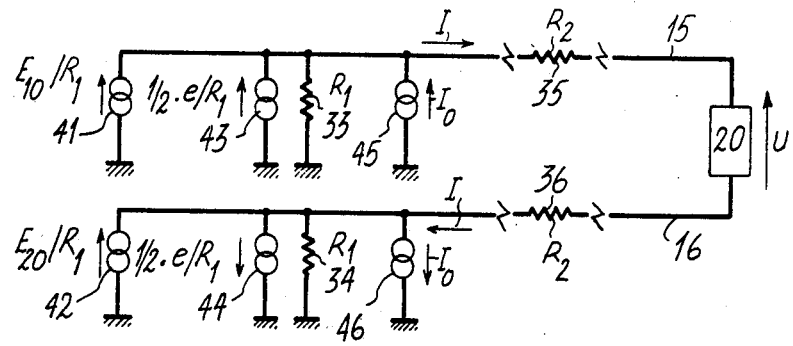

Under practical conditions, the use of this principle involves balancing, control and stability problems, which are solved by the circuit arrangement proposed by the invention. Firstly, a transformation known under the name of the Thevenin-Norton transformation makes it possible to pass from the diagram of FIG. 4 to that of FIG. 5. The circuit shown in the latter comprises two power supplies 41, 42 of respective values $E_{10}/R_1$ and $E_{20}/R_1$, two power supplies 43, 44 of value $\frac{1}{2} e/R_1$, two resistors 33, 34 of value $R_1$ and two power supplies 45, 46 of value $I_0$. A current I circulates in wires 15, 16, the direction in which the currents flow is shown in the drawing.

Figure 6:
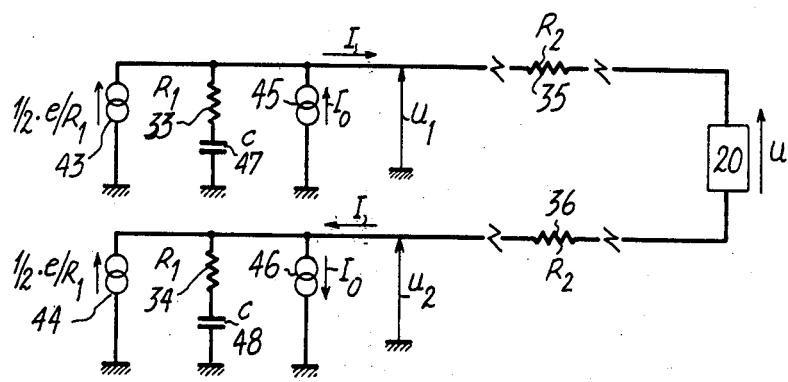

On accepting the presence of a low cut-off frequency in the transmission equation, it is possible to adopt a somewhat simpler circuit arrangement as shown in FIG. 6 using, in series with resistors 33, 34, two capacitors 47, 48. It also makes it possible to eliminate the two power supplies 41, 42, whose values are linked with the line resistance $R_2$ (consequence of equation (3)). This leads to a remote supply in current $I_0$ and not in voltage $E_0$ as therefore in the case of the prior art.

However, a disadvantage of this circuit is its lack of stability. Thus, the line voltages $U_1$ and $U_2$ are indefinite, which in practice leads to the saturation of the stages realizing the power supplies. To fix the average potential of the line wires, it is necessary to add a control device able to fix to earth the average potential of the line wires. This is the circuit adopted for the present invention.

More specifically, the present invention relates to a remote supply circuit for an analog two-wire connection comprising at least one current source inserted between the earth and each of the two wires of the connection, wherein the said source comprises a direct current remote supply source and a variable transmission current source and wherein it comprises two RC series dipoles in each case inserted between the earth and the said two wires and a circuit able to fix to the earth the average potential of the wires.

Figure 7:
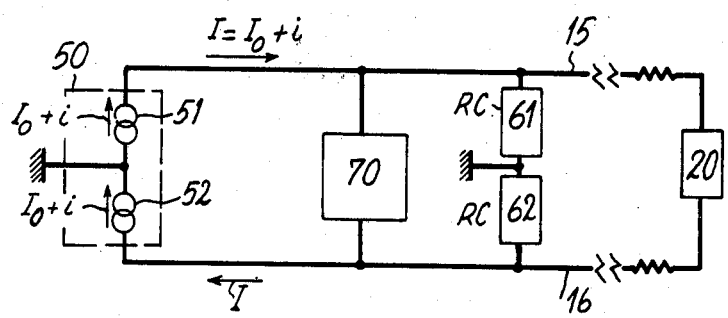
Figure 9:
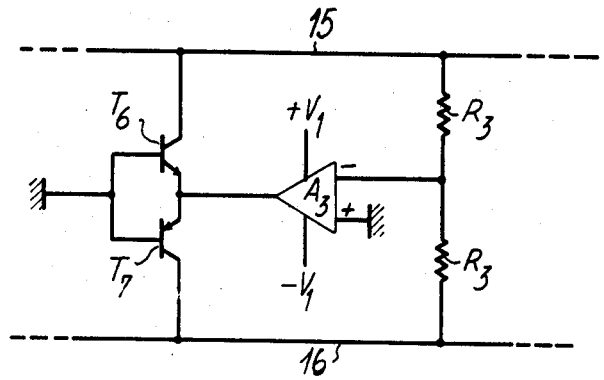

The invention is described in greater detail hereinafter relative to non-limitative embodiments. This description refers to the drawings following the aforementioned FIGS. 1 to 6 and in which show: FIG. 7 the block diagram of the circuit according to the invention. FIG. 8 a particular embodiment of this circuit. FIG. 9 a variant of the circuit for fixing the average potential of the lines.

The circuit shown in FIG. 7 comprises a double current source 50 constituted by a source 51 of remote supply direct current $I_0$ and a source 52 of variable transmission current i, two RC series dipoles 61, 62 and a circuit 70 able to fix to the earth the average potential of wires 15 and 16 of the connection. This is the general circuit diagram of the invention. Special embodiments of the different functional blocks used will now be described in conjunction with FIGS. 8 and 9.

In the circuit arrangement illustrated in FIG. 8, the circuit 50 is formed by a voltage source 53 of continuous value E and a voltage source 54 of variable value e. E is the control voltage of the remote supply current and e that of the transmission current. These sources are connected to the bases of two transistors $T_1$ and $T_2$, whose emitters are connected by a resistor $R_8$ and whose collectors are connected to two amplification circuits constituted by a differential amplifier ($A_1$, $A_2$), whose output drives the base of a transistor ($T_3$, $T_4$), whose collector is collected to one of the two wires of the line.

Transistors $T_1$, $T_3$ and $T_2$, $T_4$ and amplifiers $A_1$, $A_2$ are supplied by two lines 55, 56 at d.c. voltages $+V$ and $-V$. These lines 55, 56 are connected to transistors $T_1$, $T_2$ by resistors $R_7$, to amplifiers $A_1$, $A_2$ by Zener diodes $Z_1$, $Z_2$ and transistors $T_3$, $T_4$ by resistors $R_6$. Moreover, diodes $Z_1$, $Z_2$ are interconnected by a resistor $R_9$.

The RC dipoles 61, 62 are formed by means of two resistors $R_1$ and $R_5$ connected by an amplifier $A_4$, $A_5$ and by a capacitor $C_1$. This circuit arrangement has the advantage of reducing the value and therefore the size of capacitor $C_1$ for a given time constant. Calculation shows that the thus synthesized dipole is equivalent to a resistor of value $R_5$, $R_1$ in series with a capacitor of value $(1+R_5/R_1)C_1$.

Control circuit 70, which makes it possible to fix the average potential of the line wires to earth comprises in the illustrated variant, a differential amplifier $A_3$, whose negative input is connected to the centre of two resistors of value $R_3$, the positive input is connected to earth and the output is connected to the centre of two resistors $R_4$, which are also joined to the two wires 15, 16 of the line. This circuit makes the impedance in the common mode of the line wires low compared with the earth and does not act on the symmetrical differential mode. A variant of this circuit arrangement is given in FIG. 9, which uses two transistors $T_6$, $T_7$. The injection of control currents need not take place on the line wires and can instead take place directly upstream and in parallel on the current sources.

The diagram of FIG. 8 contains other elements and their function will now be described. A circuit 80 comprises an amplifier $A_6$ and two capacitors $C_2$ connected to the line wires 15, 16. Amplifier $A_6$ is mounted in differential and serves to extract the differential signal from the line. The two capacitors $C_2$ rejects the continuous component of the differential signal.

A circuit 82 essentially comprises an amplifier $A_7$ and connected as a summator and which serves to remove from the line differential signal the transmitted differential signal so that the voltage s which it supplies is only the image of the differential signal received from the remotely supplied device 20. With this objective, the represented circuit comprises a circuit 86 for compensating the transmitted signal. The circuit 84 is associated with an amplifier $A_8$, which serves to synthesize the necessary transfer function, which is dependent on the impedance Z of the remotely supplied device in the useful band.

Calculation shows that the transmission equation is written as a first approximation:

$$u = e \times \frac{1}{R_8} \times \frac{R_7}{R_6} \times [2R_1/(2R_2 + Z)]$$

in which $R_7$ and $R_8$ are resistances of the current sources of circuit 50, $R_1$ the resistance of dipoles 61 and 62 and $R_2$ the line resistance. If Z is real, then so is the associated transfer function.

Finally, an amplifier $A_9$ connected as a comparator and a transistor $T_9$ at the output serve to establish whether or not transistor $T_3$ is saturated. Thus, they make it possible to know whether the remotely supplied device is or is not operating correctly and also make it possible to detect the presence or absence of this device, i.e. if the line is open $T_4$ is saturated.

The illustrated circuit is completed by a number of non-essential elements such as two diodes $D_1$, $D_2$ positioned between supply lines 55, 56 and line wires 15, 16 and two Zener diodes $Z_3$, $Z_4$ between the wires and the earth.

Thus, it is apparent that the circuit according to the invention offers numerous advantages:

there are separate controls for the remote supply current and the transmission current;

the transmission and remote supply characteristics are independent of the supplies $+V$ and $-V$;

the only condition regarding +V and −V is the saturation of transistors $T_3$ and $T_4$ making it possible to use supplies which can be cut off by a microprocessor and which are automatically adjusted to the optimum value, no matter what the terminal connected or the line resistance $R_2$;

the absence of a high value capacitor makes it possible to construct the circuit arrangement on the basis of hybrid technology;

all the amplifiers (except $A_4$ and $A_5$) are at low voltage and current, i.e. inexpensive;

the remote supply current can easily be controlled by a microprocessor;

the transfer function used for compensation can also be adjusted by a microprocessor using digital synthesis.

I claim:

1. A remote supply circuit for an analog two-wire connection comprising at least one current source inserted between the earth and each of the two wires of the connection, wherein the said source comprises a direct current remote supply source and a variable transmission current source and wherein it comprises two RC series dipoles in each case inserted between the earth and the said two wires and a circuit able to fix to the earth the average potential of the wires.

2. A circuit according to claim 1, wherein the current source comprises a remote supply voltage source connected to the base of a first transistor and a transmission voltage source connected to the base of a second transistor, the emitters of these two transistors being interconnected by a resistor and the collectors are connected to the two line wires by an amplifier connected to the base of a further transistor.

3. A circuit according to claim 1, wherein the circuit able to fix the average potential of the two line wires to the earth comprises a differential amplifier having a positive input connected to the two wires by two equal resistors and a negative input connected to the earth and having an output connected to the two wires by two equal resistors.

4. A circuit according to claim 1, wherein each RC dipole is synthesized by means of two resistors connected by an amplifier, the assembly being in series with a capacitor.

* * * * *